June 25, 1968  G. T. FIALA ET AL  3,389,796
BALANCED PRESSURE RELIEF VALVE
Filed Jan. 13, 1966
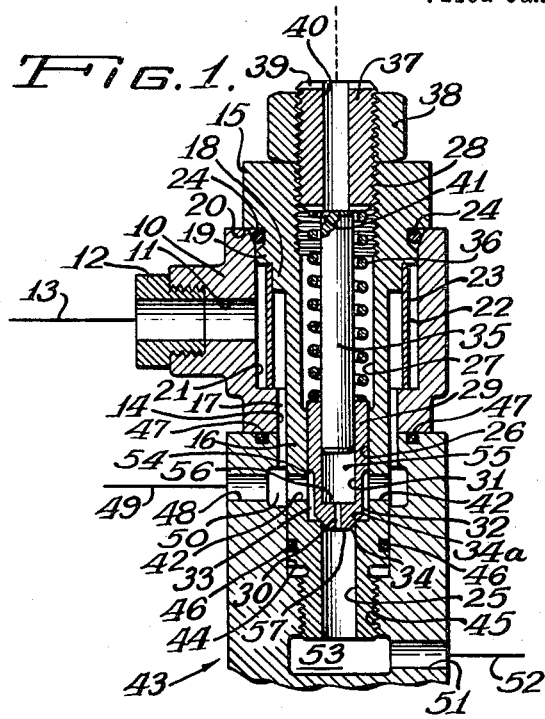
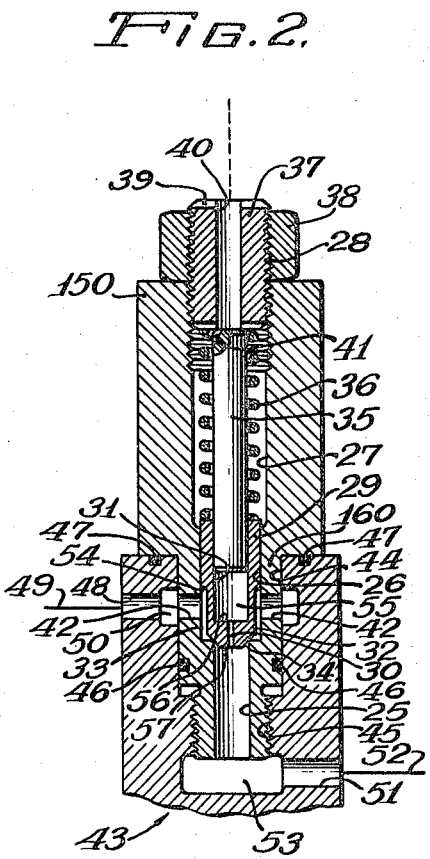
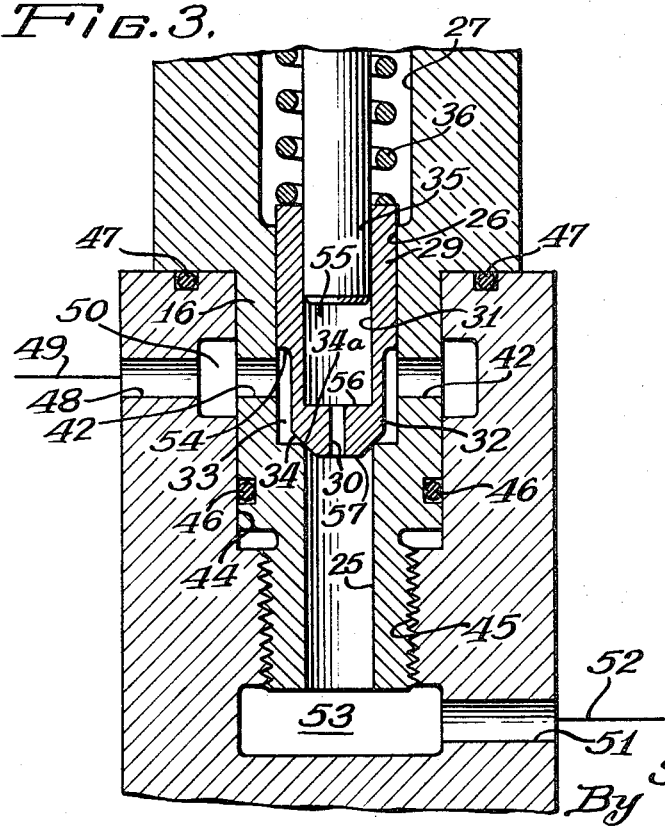
Inventors:
George T. Fiala
Sterling W. Pelton
By
Atty.

United States Patent Office 3,389,796
Patented June 25, 1968

3,389,796
BALANCED PRESSURE RELIEF VALVE
George T. Fiala, Clarendon Hills, and Sterling W. Pelton, La Grange, Ill., assignors to International Harvester Company, a corporation of Delaware
Filed Jan. 13, 1966, Ser. No. 520,431
9 Claims. (Cl. 210—130)

The invention relates to valve structures but more particularly to pressure regulating valves of the type which operate automatically to release fluid when the pressure in an associated supply line attains a predetermined value.

Heretofore the valve devices provided for pressure regulating purposes were not arranged so as to be insensitive to pressures in the outlet or downstream side thereof hence they were not entirely suitable for interconnectable use between high and low pressure circuits. Furthermore, most such pressure regulating devices did not provide for the normal flow therethrough of fluid in the fluid supply circuit associated therewith without first actuating an element in the valve to establish free fluid communication between the inlet and the work outlet of said valve unit.

It is a principal object therefore of the present invention to provide a pressure regulating valve wherein the regulation of pressure on the upstream side thereof is insensitive to the pressure on the downstream side thereof when said valve is interconnected between two hydraulic circuits operating at different pressures.

Another object is to provide a pressure regulating valve incorporating a slidably actuable poppet element therein that is hydraulically balanced by fluid pressure from the downstream or secondary circuit into which said valve is communicatively connected so that regulation of pressure in the primary or upstream circuit into which said valve is connected is independent of the pressure or variations thereof in said interconnected secondary circuit.

A still further object is to provide a pressure regulating valve constructed and arranged to normally provide free fluid communication between the inlet and a first outlet thereof but which is actuable to by-pass quantities of fluid from the inlet to a second outlet connected to a lower pressure circuit in order to maintain a constant fluid pressure for the flow between said inlet and first outlet thereof without regard to the pressure in the associated lower pressure circuit.

Another important object is to provide an improved pressure regulating valve wherein an axial orifice in a slidably actuable poppet element functions to provide a balanced type valve as well as to dampen response movements of said poppet.

A further important object is to provide improved valve means operable for maintaining constant pressure in one of two hydraulic circuits communicatively interconnected by said valve means.

The foregoing and other objects and features of the invention will become apparent as the disclosure is more fully made in the following detailed description of preferred embodiments of the invention as illustrated in the accompanying sheets of drawings in which:

FIGURE 1 is a vertical sectional view of one preferred embodiment of the proposed pressure regulating valve;

FIGURE 2 is a view similar to FIGURE 1 but showing a modified form of the proposed pressure regulating valve;

FIGURE 3 is an enlarged fragmentary sectional view of the lower portion of the proposed valving unit.

Referring now to FIGURE 1, it will be seen that one preferred embodiment of the proposed valve is of the type adaptable to acccommodate flow therethrough of fluid from an associated hydraulic circuit in which a substantially constant pressure is to be maintained. As illustrated, the proposed valve comprises a body member 10 having a port opening 11 fitted with a coupling 12 adapted for connection in turn by a conduit such as 13 to the work unit or mechanism which in the present instant may be the servo cylinders of a hydrostatic transmission, neither of which are shown herein.

Said body member is fashioned with an axially extending stepped opening or bore 14 dimensioned to receive an elongated sleeve-like cylinder member 15. One end of said sleeve has a reduced section portion 16 the diameter of which is slightly less than the bore 14 so as to provide an axially extending annular passage or chamber 17 therebetween. At the inner end of reduced section portion 16 there is provided a somewhat larger diametered reduced section portion 18 and adjacent the latter section an additional further enlarged reduced section portion 19 which provides a shoulder 20 for abuttingly receiving the upper surface of body member 10 thereagainst. The bore 14 of body 10 has an enlarged portion 21 contiguous with the annular passage or chamber 17 which, as disposed provides an annular chamber 22 between the bore 21 and the reduced section portions 16 and 18, of sleeve 15, that communicates with port opening 11 in said body. A cylindrical sleeve-like conventional filtering screen element 23 fitted into the annular chamber 22 is dimensioned to abut the reduced section portion 18 while extending axially the full length of said annular chamber. It will be seen therefore that all fluid flowing through port opening 11 from annular passage 17 must pass through the filter screen element 23. A suitable fluid seal such as represented at 24 may be provided, as indicated, adjacent the abutting surfaces of body 10 and sleeve 15 to restrict leakage therebetween as is well understood.

A central axial bore 25 extends inwardly from a lower end surface of sleeve 15 to a slightly larger bore 26 which, in turn, opens into a further enlarged bore 27 the other end of which is threaded, as shown at 28, for purposes which will presently be explained. Slidably positioned within bore 26 is a cylindrically shaped poppet element 29 having an axially extending passage or orifice 30 opening into an interior bore 31 in said poppet. Poppet 29 is also fashioned with an axially extending exterior annular groove 32 adjacent one end thereof and which as disposed provides an annular chamber or passage 33 between said poppet and bore 26 of sleeve member 15. The lower end of poppet 29 is fashioned with a conical valve surface 34 that is disposed to engage the inner end edge of bore 25 which thereby provides a seat 34a for said poppet valve surface. In order to provide for balancing, as will be more fully discussed hereinafter, the diameter of said valve seat should correspond with the diameter of bore 31 as best seen in FIGURE 3. An elongated piston member 35 is dimensioned for slidable positioning within the bore 31 of poppet 29 and serves as a reaction and stop member as will be seen as the description proceeds.

Circumscribing piston 35 within bore 27 is a coil spring 36 one end of which is disposed in abutting relation with the end surface of poppet 29 while the opposite end of said spring abuts an adjusting screw 37 threadably positioned into one end of bore 27. A lock nut 38 may be used in cooperation with screw 37 to lock the latter screw in position after the spring 36 has been stressed to a value that will provide the pressure regulation desired. A diametral slot 39 may be provided in the end surface of screw 37 to facilitate adjustment thereof. A passageway in the form of a central bore 40 through screw 37 communicates with an angularly disposed slot or kerf 41 in the upper end of piston 35 to accommodate flow of leakage therethrough from the interior of the valve unit to a fluid reservoir of the hydraulic system (not shown).

Radially extending port openings such as 42 in sleeve member 15 are fashioned to provide fluid communication therethrough into chamber 33 adjoining the groove 32 in poppet 29.

The valving unit, including sleeve 15 and the components therewithin together with the body member 10, is adapted for positioning into a support casing or housing such as indicated generally at 43. Said casing is fashioned to provide a bore 44 dimensioned to receive one end of sleeve 15 in snug-fit relationship therewithin, and a reduced section extension 45 of bore 44 is threaded to receive the threaded end of said sleeve so that when sleeve 15 is pulled up tight body member 10 will be in a tight fit engagement with the upper surface of said casing. Seal rings such as shown at 46 and 47 may be provided to restrict fluid leakage along abutting surfaces as is well understood.

An inlet port opening 48 in said casing is adapted for connection by conduit means 49 with a fluid pressure source such as a higher pressure circuit or a pump (not shown). Said inlet port opening opens into an annular chamber 50 which in turn communicates with annular passages 17 and 33. An exhaust port opening 51 in said casing is adapted for connection by conduit means 52 with an exhaust circuit which may be the fluid reservoir of the hydraulic system or an additional lower pressure hydraulic circuit neither of which are shown on the drawing. Exhaust port 51 also communicates with a chamber 53, formed within the support casing 43 adjacent the end of sleeve 15 extending thereinto, which in turn is in free communication with bore 25 of said sleeve.

As illustrated, the support casing 43 is depicted as a separate or individual component although it is envisaged that this casing support means may be formed as part of a larger housing assembly containing other components or even as part of a pump unit with which it may be associated. It is also envisaged that the body member, the sleeve member and support casing may all be fashioned as an integral unit or unitary member within the teachings of the inventive concepts herein.

In FIGURE 2 there is shown one preferred modified form of the proposed invention. In this application of the proposed invention the fluid in the hydraulic supply circuit wherein the pressure is to be regulated does not normally flow through the valve, but rather the valve is connected by a branch or tap-off line to the circuit being regulated, and as so connected said valve is normally continuously maintained under the fluid pressure in the connected supply line being regulated. As thus proposed the valve requires only one inlet and one outlet connection. For purposes of simplification in description like elements will be designated with the same reference numerals as employed in describing the embodiment shown in FIGURE 1, while modified elements will be designated with like reference symbols plus the numeral one hundred added thereto.

An elongated sleeve-like cylinder member 150 has fashioned at one end thereof a reduced section portion 160 with a central bore 25 which extends inwardly from a lower end surface thereof. Bore 25 opens into a slightly enlarged bore 26 which, in turn, opens into a further enlarged bore 27 the other end of which is threaded as shown at 28. Slidably positioned within bore 26 is the poppet element 29 with an axially extending passage or orifice 30 therein that opens into an interior bore 31 in the poppet. Poppet 29 also includes an axially extending exterior annular groove 32 adjacent one end thereof which cooperates with bore 26 to provide an annular chamber or passage 33 between said poppet and the latter bore. The lower end of poppet 29 has a conical valve surface 34 thereon that engages in seating relation the inner end edge 34a of bore 25. As heretofore mentioned, in order to provide for hydraulic balancing the diameter of said valve seat should correspond with the diameter of bore 31. An elongated piston member 35 is dimensioned for slidable positioning within bore 31 of said poppet.

Circumscribing piston 35 within bore 27 is coil spring 36 one end of which abuts the end surface of poppet 29 while the opposite end of this spring abuts adjusting screw 37 threadably mounted in one end of bore 27 and lock nut 38 cooperates with said screw to lock the latter in position after the spring has been stressed as desired. A diametral slot 39 in the end of screw 37 facilitates ready adjustment thereof. A central bore 40 provides a passageway through screw 37 that communicates with an angularly disposed slot or kerf 41 in the end of piston 35 to accommodate leakage flow therethrough to the fluid reservoir of the hydraulic system. Radial port openings 42 in sleeve 150 provide fluid communication into chamber 33 adjoining the groove 32 in poppet 29.

As heretofore noted, in connection with the embodiment shown in FIGURE 1, the valving unit of FIGURE 2 is adapted for positioning into a support casing or housing, such as indicated at 43, which may provide the bore 44 therein to receive the reduced section end of sleeve 150 in a snug-fit relationship, while a reduced section extension 45 of the latter bore threadably receives the end of said sleeve. Thus by tightly threading sleeve 150 into casing 43 said sleeve is made to tightly engage the upper surface of said casing, while fluid sealing rings 46 and 47 may be provided to restrict fluid leakage between abutting surfaces thereof as is well understood.

Inlet port 48 in the casing, as heretofore noted, is adapted for connection by conduit means 49 with a fluid pressure source such as a higher pressure circuit or a fluid pump (not shown), and additionally opens into the annular chamber 50 that communicates with the annular passage 33. Exhaust port opening 51 in said casing is adapted for connection by conduit means 52 with an exhaust circuit which, of course, may take the form of a fluid reservoir or an additional hydraulic circuit operated at a lower pressure than the circuit to which the inlet port thereof is connected, and additionally communicates with chamber 53 in said casing opening into bore 25 of sleeve 150.

As previously noted support casing 43 may be individually fashioned or formed as a part of a larger housing assembly containing other components or as part of a pump unit with which it may be associated. Likewise said support casing and sleeve member may be fashioned as an integral unit within the concepts of the present invention.

*Operation*

Referring initially to FIGURE 1 conduit 49 receives fluid under pressure either from a pump or as exhaust from a higher pressure circuit and thereafter directs the flow thereof through chamber 50, annular passage 17 into annular chamber 22 where it passes through the filter screening element 23 into port opening 11 and out through conduit 13 to a work device such as the servo cylinders of a hydrostatic transmission. Although the specific application referred to herein suggests use of the proposed valve in a particular environment it will be appreciated that such device is equally applicable to other employment within the purview of the teachings hereof and hence its use should not be restricted to the application so proposed.

It will be seen, referring again to FIGURE 1, that fluid under pressure in chamber 50 also enters radial ports 42 and fills the annular chamber 33 encompassing the lower end of sleeve 15 where, acting against its radial surface 54 at the end of groove 32 on poppet 29, it tends to urge said poppet upwardly and is resisted by the reactive force of spring 36 abutting the end of the poppet. The reactive force of the spring is pre-set by adjustment of screw 37 and of course is correlated with the predetermined pressure it is desired to maintain in the associated primary hydraulic circuit. When the fluid pressure in inlet port opening 48 exceeds that for which the spring is preset to hold the poppet on its seat 34a the force of said excess pressure will unseat poppet 29 and permit the bypass or flow of fluid from annular chamber 33 into bore 25, chamber 53, outlet port 51 into conduit 52 and the secondary circuit which is maintained at a lower pressure. With the release of such fluid the pressure in chamber 50 will be reduced and when the pressure has returned to the desired value for which the system was pre-set poppet 29 will be reseated by the reactive force of spring 36 and the system is returned to normal operation. It will be appreciated however, that by proper proportioning of the spring 36 and the area 54 relative to the pressures in conduit 49 the poppet can also be used to maintain a predetermined pressure by constantly by-passing a limited quantity of fluid.

Normally fluid in chamber 53 will find its way through bore 25 and the orifice or axial passage 30 into a variable chamber 53 disposed between the end of piston 35 and the inner end surface 56 of poppet 29 and will provide a pressure that reacts against the inner radial surface area 56 and the lower end surface of piston 35 and since the area of surface 56 is substantially identical with the area of surface 57 of the poppet exposed to fluid pressure in bore 25 the fluid pressures on said poppet resulting from fluid in bore 25 will be equalized and the poppet will be hydraulically balanced. Hence even though the pressure in the exhaust circuit and in bore 25 may vary from time to time poppet 29 will remain balanced and thus the pressure or any changes therein of fluid in said exhaust circuit will have no effect on the operation of said poppet, thus it will be seen that the operation of said poppet resulting from pressure variations in the primary or inlet circuit is insensitive to pressures in the exhaust or secondary circuit.

It will also be seen that with fluid normally in chamber 55 and since the velocity of exhaust of such fluid therefrom is restricted by virtue of the small diametered orifice passage 30 the speed of response of movement of poppet 29 is slowed down thus a highly desirable dampening of the poppet operation is provided.

Referring again to FIGURE 2 it will be noted that conduit 49 is normally under pressure with fluid from the associated circuit, wherein pressure regulation is to be accomplished, as are also the interconnected inlet port 48, chamber 50, radial openings 42, and the annular chamber 33 where said pressure acting against the radial surface 54 tends to urge poppet 29 off its seat 34a. Movement of poppet 29 however, is resisted by spring 36 and said poppet is normally maintained seated. When the fluid pressure in the circuit interconnected with conduit 49 exceeds the value for which the reactive force of said spring is pre-set this excess pressure will cause poppet 29 to unseat and thereupon permit the by-pass or discharge of fluid from annular chamber 33, as before, into bore 25, chamber 53, outlet port 51 into conduit 52 and the secondary circuit which is maintained at a pressure lower than that at which the primary circuit or circuit connected to the inlet opening is maintained. With the release or by-pass of a quantity of fluid at the higher pressure the pressure in chamber 50 will then be reduced and as soon as this pressure has returned to the prescribed pressure for the circuit poppet 29 will be reseated by the action of spring 36 and the system is returned to normal operation.

The poppet balancing action and response dampening operation for this embodiment is identical with that heretofore explained in connection with the operation of the embodiment illustrated in FIGURE 1 and thus will not be repeated.

It should now be apparent that the proposed pressure regulating valve provides an improved means for maintaining the pressure in one fluid circuit constant regardless of the flow therein. Furthermore, the novel means proposed for balancing the valve permits the use of a lighter and more economical spring element therein while still permitting a large volume of flow in the associated hydraulic circuit. Additionally it will be recognized that the proposed device readily provides a novel means for interconnecting a primary circuit maintained at one pressure with a secondary circuit operating at a lower pressure and wherein automatic pressure regulation of the pimary circuit remains insensitive to the pessure or to variations thereof in the associated secondary circuit.

Although only preferred forms of the invention have been illustrated, and described in detail, it will be apparent to those skilled in the art that various modifications may be made therein without departing from the spirit of the invention or from the scope of the appended claims.

What is claimed is:

1. A pressure regulator comprising a housing having an inlet and an outlet and having a bore extending inwardly from one end thereof, means in said housing forming separate passages communicating said bore respectively with said inlet and with said outlet, poppet valve means slidably disposed in said bore and having an annular groove thereon fashioned to provide a chamber between said poppet and said bore communicating with said inlet, means closing an open end of said bore, means proximate an inner end of said bore forming a valve seat for said poppet, resilient means compressibly positioned in said bore between said poppet and closure means normally urging said poppet into a closed position on said seat, said poppet having a bore extending inwardly from one end thereof, piston means slidably disposed within said poppet bore, said poppet having an orifice opening communicating at opposite ends of said opening respectively with the interior of said poppet bore and with said outlet.

2. The structure described in claim 1 further characterized in that the inlet is adapted for connection to a source of fluid pressure and the outlet is adapted for connection to a fluid source, and wherein the resilient means is stressed to maintain the poppet seated on the valve seat against a predetermined fluid pressure in said inlet but which when said inlet pressure is exceeded is operative to permit unseating said poppet to by-pass a quantity of fluid from said inlet to said outlet and thereby effect a reduction in the fluid pressure in said inlet without regard to the pressure in said outlet.

3. The structure described in claim 1 further characterized in that the piston slidably disposed in the poppet bore is dimensioned to delimit a chamber formed within the poppet bore between said piston and an inner radial wall surface of said poppet for accommodating fluid received therein through said orifice opening from the passage communicating with said outlet, and wherein the effective area of said inner radial wall surface for reaction of fluid pressure is substantially equivalent to the effective area of the outer radial wall surface of said poppet delimited by said valve seat whereby fluid pressures on opposite sides of said poppet are balanced.

4. The structure described in claim 2 further characterized in that the source of fluid pressure to which the inlet connects is maintained at a higher pressure than the fluid source to which the outlet connects, and further in that the lower pressure fluid in said outlet communicates with opposite surfaces of an end wall of said poppet to provide balanced pressures thereagainst so that regulation of pressure in said inlet is insensitive to the pressure in said outlet.

5. The structure described in claim 1 and further characterized in that said housing includes a first portion having an inlet an outlet and a bore therein and a second portion having an extension thereon that is threadably securely mounted in the bore of said first portion and further having a bore in said second portion arranged to accommodate said closure means the said resilient means and said poppet valve and providing the seat for said poppet, and having the passage means communicating with said inlet additionally extending through said housing extension for communication with the bore of said second portion.

6. The structure described in claim 2 and further characterized in that said poppet valve means is fashioned with an annular groove thereon providing an annular chamber between said poppet and said bore communicating at all times with the passage means between said bore and said inlet, and further in that the closure means for closing an open end of the bore is adjustably operative for adjusting the stressing of said resilient means according to the value of the pressure to be maintained in said inlet.

7. A pressure regulator comprising a housing having an inlet adapted for fluid flow connection with a source of fluid pressure, a first outlet adapted for fluid flow connection to a fluid source and a second outlet adapted for fluid flow connection to a hydraulic work device, means forming a fluid flow passage in said housing continuously communicatively connecting said inlet with said second outlet to permit uninterrupted fluid flow from said inlet to said second outlet, fluid filter means disposed in said passage, valving means in said housing disposed in fluid connection with said inlet and said outlets, resilient means normally urging said valving means into a closed condition interrupting fluid communication between said inlet and said first outlet without interrupting fluid communication between said inlet and said second outlet but being operative to open responsive to an increase in pressure beyond a predetermined value in said inlet to by-pass a quantity of fluid from said inlet to said first outlet to reduce the pressure in said second outlet, and balancing means cooperative with said valving means for hydraulically balancing said valving means whereby pressure regulation in said second outlet is insensitive to the pressure of fluid in the first outlet thereof.

8. A pressure regulator comprising a housing having an inlet adapted for fluid flow connection with a source of fluid pressure, a first outlet adapted for fluid flow connection with a fluid source and a second outlet adapted for fluid flow connection with a hydraulic work device, said housing having a bore extending inwardly from one end thereof, first and second means in said housing forming separate passages communicating said bore respectively with said inlet and with said first outlet, third means forming a passage continuously communicating said second outlet with said first passage means, fluid filter means disposed in said third passage means, poppet valve means slidably disposed in said bore and having an annular groove thereon fashioned to provide a chamber between said poppet and said bore communicating with said first passage means, means closing an open end of said bore, means proximate an inner end of said bore forming a valve seat for said poppet, resilient means compressibly positioned in said bore between said poppet and closure means normally urging said poppet into a closed position on said seat, said poppet having a bore extending inwardly from one end thereof, piston means slidably disposed within said poppet bore, said poppet having an orifice opening communicating at opposite ends of said opening respectively with the interior of said poppet bore and with said outlet.

9. The structure described in claim 8 and further characterized in that said housing includes a first portion having the inlet and said first outlet and a bore therein, a second portion having an extension thereon that is threadably securely mounted in the bore of said first portion and having a bore in said second portion arranged to accommodate said closure means said resilient means and said poppet valve and providing the seat for said poppet valve, and having the first passage means communicating with said inlet extending through said first and second housing portions to communicate with the bore of said second housing portion, and further in that said housing includes a third portion encompassing said second housing portion and includes the said second outlet therein and said third passage means comprising a first annular chamber disposed between said first and second housing portions and a second annular chamber containing the filter means therewithin and disposed between said second and third housing portions.

References Cited
UNITED STATES PATENTS

| | | | |
|---|---|---|---|
| 1,611,457 | 12/1926 | Keller | 137—549 XR |
| 2,845,088 | 7/1958 | Crausman | 251—282 XR |
| 2,850,037 | 9/1958 | Eysbergen | 251—282 XR |
| 2,878,828 | 3/1959 | Klastad | 251—282 XR |

FOREIGN PATENTS 599,956  11/1959  Italy.

WILLIAM F. O'DEA, *Primary Examiner.*

H. W. WEAKLEY, *Assistant Examiner.*